United States Patent [19]

Young et al.

[11] Patent Number: 5,188,151
[45] Date of Patent: Feb. 23, 1993

[54] FLOW DIVERTER VALVE

[75] Inventors: Frederick C. Young, Maineville; D. Lee Garbutt, Jr., Cincinnati, both of Ohio

[73] Assignee: Cold Jet, Inc., Loveland, Ohio

[21] Appl. No.: 781,326

[22] Filed: Oct. 22, 1991

[51] Int. Cl.⁵ .................................. F16K 3/00
[52] U.S. Cl. .................................. 137/874
[58] Field of Search .......................... 137/874

[56] References Cited

U.S. PATENT DOCUMENTS

| | | |
|---|---|---|
| 3,581,768 | 6/1971 | Conti . |
| 3,762,664 | 10/1973 | Loveless . |
| 3,874,490 | 4/1975 | McAlister . |
| 4,133,418 | 1/1979 | Van Bilderbeek ............ 137/874 X |
| 4,157,848 | 6/1979 | Smoot .......................... 137/874 X |
| 4,223,700 | 9/1980 | Jones . |
| 4,886,401 | 12/1989 | Andrews et al. . |
| 4,893,656 | 1/1990 | Willhoft ....................... 137/874 |

Primary Examiner—John C. Fox
Attorney, Agent, or Firm—Frost & Jacobs

[57] ABSTRACT

This invention is directed to a flow diverter valve for directing a flow of high pressure transport gas with carbon dioxide pellets entrained therein from a single inlet to a selected one of a plurality of outlets. The flow diverter valve includes a system of face seals and shaft seals adjacent the inlet and outlet ends in order to prevent the leakage of high pressure gas from the flow path.

16 Claims, 8 Drawing Sheets

FLOW DIVERTER VALVE

TECHNICAL FIELD

The present invention relates generally to a valve for diverting a flow from a single inlet to any one of two or more outlets, and is particularly directed to a flow diverter valve for use with the bulk solid flow of cryogenic media, such as $CO_2$ pellets entrained in a high pressure transport gas. The invention will be specifically disclosed in connection with a flow diverter valve which is provided with a system of seals that effectively isolates the pressurized transport gas from the moving parts of the flow diverter valve, thereby allowing reliable and repeatable operation of the flow diverter valve.

BACKGROUND OF THE INVENTION

Particle blast cleaning apparatuses using sublimable media are well known in the industry. U.S. Pat. No. 4,947,592, which is incorporated herein by reference, describes in detail a particle blast cleaning apparatus in which carbon dioxide pellets are formed and introduced into a flow of high pressure transport gas. The carbon dioxide pellets are carried, entrained in the transport gas, through a hose having a discharge nozzle at its exit end. The flow of the entrained carbon dioxide pellets is directed by the nozzle at a particular work piece so as to perform some function thereon, such as cleaning, coating removal or deflashing, for example.

Frequently, it is desirable to have more than one nozzle available for use in a situation where the multiple nozzles will not be used simultaneously. Because of the high cost of the equipment necessary to create the carbon dioxide pellets and transport them entrained in the transport gas for discharge through a nozzle, it is desirable to connect multiple nozzles and associated hoses to a single source of carbon dioxide pellets.

Because the temperature of the flow is in the range of minus 60° F. to minus 110° F., and because the pressure of the transport gas is typically very high, ranging up to 350 psig, it is difficult for a flow diverter valve to operate reliably. Because of the cryogenic temperatures, any moisture which reaches any components of the flow diverter valve may form water ice which can build up and interfere with the proper operation of the flow diverter valve. Sources of such moisture include the ambient air surrounding the flow diverter valve, and to a lesser extent the high pressure transport gas. Sealing against leakage of the transport gas at moveable joints, as are present in a flow diverter valve, is particularly difficult because of the high pressures involved and the contraction of the components caused by the cold temperatures. The problem is exacerbated by the fact that the joints which are susceptible to leakage are typically located in areas of the flow diverter valve which are very susceptible to being blocked by any water ice build up, thereby preventing proper operation.

Additionally, the flow of the carbon dioxide pellets entrained in the high pressure transport gas is particularly susceptible to agglomeration. The flow diverter valve must not interfere with the flow or cause agglomeration. The valve must have a negligible pressure drop through it, and present very little disturbance to the laminar flow of pellets within the flow stream.

SUMMARY OF THE INVENTION

Accordingly, it is a primary object of the present invention to provide a flow diverter valve which permits alternate connection of multiple outlets to a single inlet that is capable of handling the bulk solid flow of cryogenic media.

It is another object of the present invention to provide a flow diverter valve which includes a seal system which minimizes leakage of high pressure transport gas.

It is yet another object of the present invention to provide a flow diverter valve having a flow path which presents negligible flow loss from the inlet to the outlet, and negligible disturbance to the laminar flow within the flow tube.

Yet another object of the present invention is to provide a flow diverter valve which minimizes the build up of water ice on the internal moving parts of the valve.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a flow diverter is provided having an inlet, an exit end cap with a generally planar surface, a plurality of outlets formed in the exit end cap, and a tube defining an internal passageway between the inlet and one of the outlets. The tube has a first end which is in fluid communication with the inlet, and a second end which is alternatively alignable in fluid communication with each of the outlets. A seal plate which has a generally planar surface is disposed adjacent the generally planar surface of the exit end cap. A bore is formed through the seal plate, and at least a portion of the second tube end is disposed therein. First means are provided for sealing between the exit end cap and the seal plate, and second means are provided for sealing between the second tube end and the seal plate. Additional means are provided for urging the seal plate against the generally planar surface of the exit end cap.

According to a further aspect of the present invention, a flange, carried by the first end and extending radially therefrom, is disposed in a bore formed in an entrance end cap. A spacer having means for sealing between the spacer and the bore is disposed adjacent one surface of the flange. A second spacer is disposed in the bore on the opposite side of the flange from the first spacer. A third spacer is disposed adjacent the second spacer in another portion of the bore, being retained therein by a seal housing. A combination face and shaft seal is disposed in a groove formed in the seal housing. The shaft seal portion sealingly engages the outside diameter of the first end of the tube. The face seal portion sealingly engages a surface of the third spacer.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
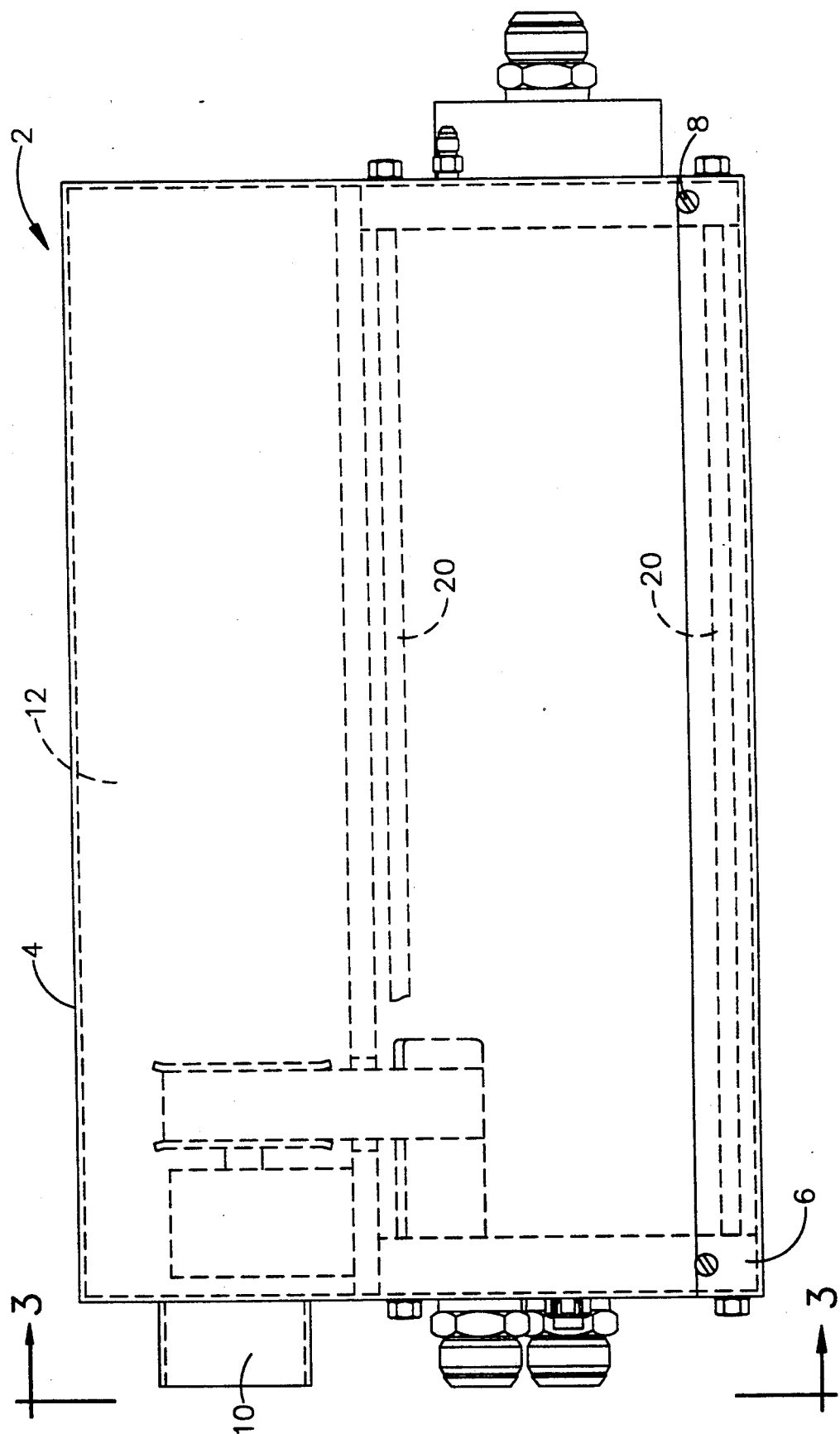
FIG. 1 is a side elevational view of the flow diverter assembly of the present invention, showing some internal components in hidden lines.

FIG. 1 shows a side elevational view of the flow diverter assembly according to the present invention, indicated generally at 2. Flow diverter assembly 2 includes flow diverter 3 which is enclosed by cover 4 which is secured to base 6 by fasteners 8. Cover 4 includes outlet 10, which allows $CO_2$ gas to flow out of the slightly pressurized internal cavity 12 of flow diverter assembly 2.

Figure 2:
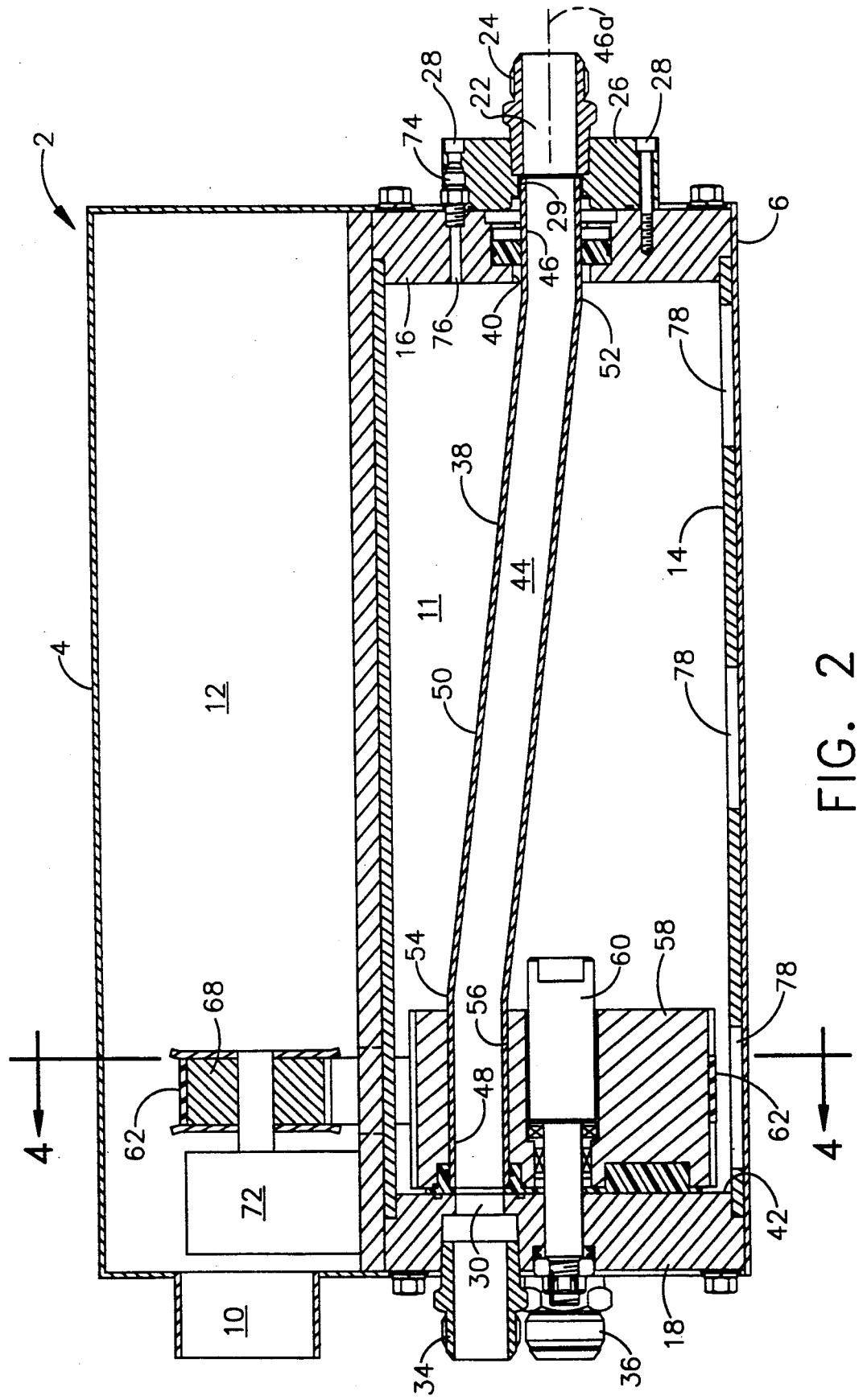
FIG. 2 is a side cross-sectional view of the flow diverter assembly of FIG. 1.

Referring to FIG. 2, flow diverter 3 includes housing 14, which is generally tubular in shape, and entrance end cap 16 and exit end cap 18 secured adjacent opposite ends of housing 14 by tie rods 20 (FIG. 1). Flow diverter 3 includes inlet 22, which is aligned with fitting 24. Fitting 24 is carried by seal housing 26, threadingly engaging internal bore 29 thereof. Seal housing 26 is secured to entrance end cap 16 by fasteners 28. Housing 14, end caps 16 and 18, and seal housing 28 are made of aluminum.

Figure 3:
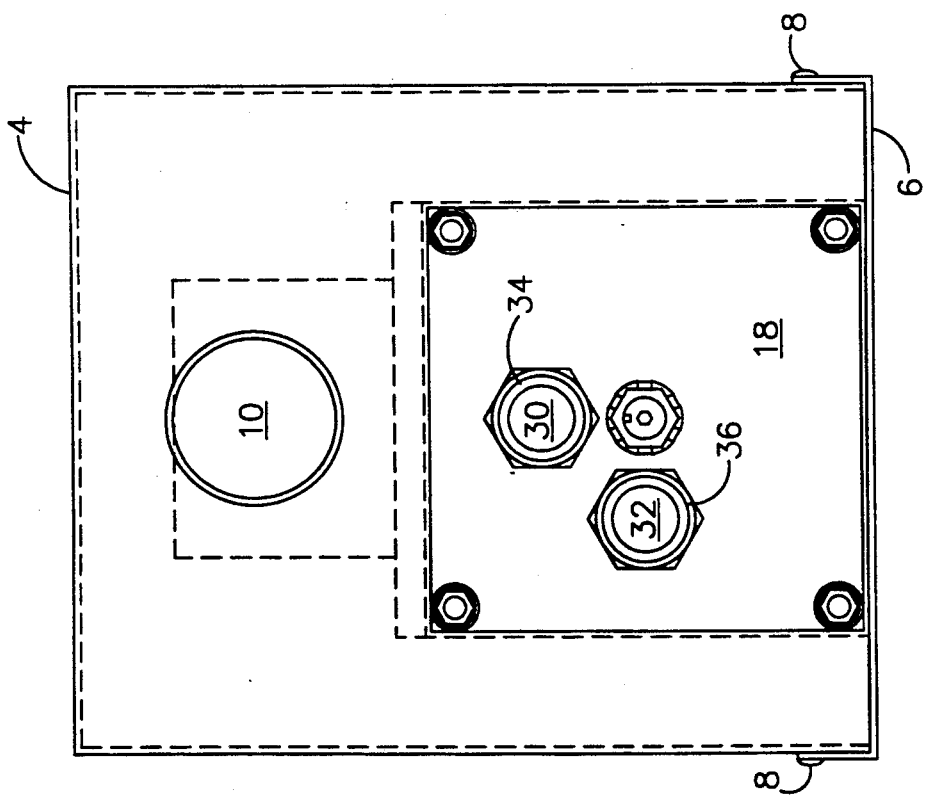
FIG. 3 is an end view of the flow diverter assembly taken in the direction of line 3—3 of FIG. 1.

At the opposite end of housing 14, exit end cap 18 is located, including a plurality of spaced apart outlets 30 and 32 (see also FIG. 3) formed in exit end cap 18. Although only two outlets are illustrated in the preferred embodiment, it will be understood that additional outlets can be formed through exit end cap 18 in order to provide for additional flow paths. It is also noted that the size of end cap 18, and concomitantly the size of flow diverter 3 may be increased as necessary in order to allow room for additional flow paths. Fittings 34 and 36 are carried by exit end cap 18, aligned with outlets 30 and 32 as illustrated.

Flow tube 38, which is made of stainless steel, extends from inlet 22, through bore 40 formed in entrance end cap 16, through internal cavity 11 to a location near surface 42 of exit end cap 18. Flow tube 38 defines internal passageway 44 which extends from first end 46 to second end 48 of flow tube 38. First end 46 includes a straight portion and is aligned in fluid communication with inlet 22. First end 46 is centered about its axis 46a. Second end 48 includes a straight portion which is generally parallel with and offset from axis 46a. Second end 48 is alternatively alignable in fluid communication with each outlet formed through exit end cap 18, i.e. outlets 30 and 32 (see FIG. 3) in the preferred embodiment, as will be described in detail below.

Intermediate portion 50 of flow tube 38 extends from first end 46 to second end 48, and is generally straight therebetween. An angle is formed in flow tube 38 at interface 52 of intermediate portion 50 with first end 46. An equal angle is formed in flow tube 38 at interface 54 between intermediate portion 50 and second end 48. In the preferred embodiment, this angle is less than 15°. The shape of flow tube 38 is selected to allow for negligible pressure drop in the flow, and negligible disturbance to laminar flow of pellets within the stream, i.e. no boundary layer separation. Therefore, there is negligible wall contact by the pellets.

Second end 48 of flow tube 38 is disposed in bore 56 of pulley 58. Pulley 58 is rotatably supported by shaft 60 to rotate about its axis which is generally aligned with axis 46a. Shaft 60 urges pulley 58 toward surface 42 of exit end cap 18, as will be more fully described below. Second end 48 is precisely aligned with a respective outlet, 30 or 32, by rotating pulley 58 through the appropriate angle. The precise alignment of second end 48 with a respective outlet is critical, and the cross-sectional area of flow tube 38 should have at least a 99% overlap with the cross-sectional area of the outlet.

Figure 4:
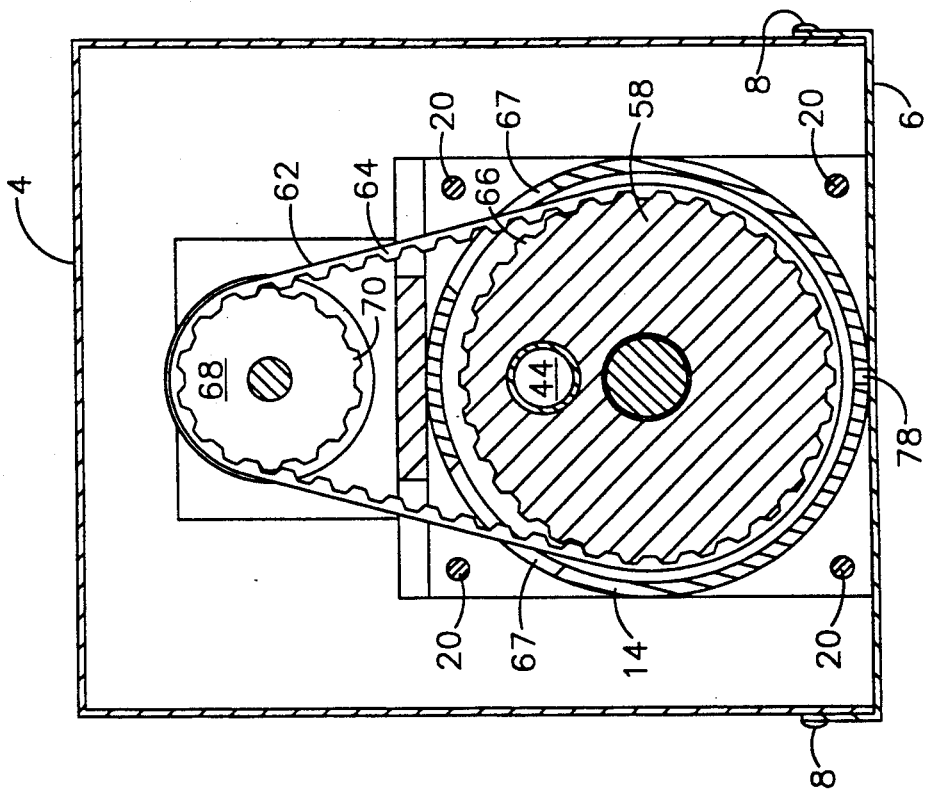
FIG. 4 is a cross-sectional view of the flow diverter assembly taken along line 4—4 of FIG. 2.

As more clearly shown in FIG. 4, means are provided for rotating pulley 58, such that second end 48 is precisely aligned with a respective outlet to prevent any steps or eccentric misalignment of the flow path, which will result in the disruption of laminar flow and the creation of turbulence. Such turbulence creates a flow blockage and a pressure drop, and disintegrates the pellets into non-useable fine particles. Mechanical stops may be provided to ensure precise alignment. In the preferred embodiment, pulley 58 is driven by belt 62, which includes internal ribs 64 which mesh with external teeth 66 disposed about the periphery of pulley 58. Belt 62 extends through slots 67 formed in housing 14, and is driven by drive pulley 68, which includes external teeth 70 that engage ribs 62. Returning to FIG. 2, drive pulley 68 is driven by drive means 72 which function to rotate drive pulley 68 such that pulley 58 is rotated so as to alternatively align second end 48 with outlet 30 or outlet 32. In the preferred embodiment, drive means 72 are pneumatic cylinders arranged to rotate drive pulley 68 to align second end 48 with either outlet 30 or outlet 32. Drive means 72 could, for example, also be a step motor, or even a hydraulic actuator. It is important that means 72 be capable of operating in a cryogenic environment.

In operation, inlet 22 is connected to a single source of $CO_2$ pellets and high pressure transport gas, ranging in pressure in the preferred embodiment up to 350 psig, by a hose (not shown). At the other end of flow diverter assembly 2, outlets 30 and 32 are connected with respective downstream nozzles through respective hoses (not shown) which are secured to fittings 34 and 36, respectively. In the position shown in FIG. 2, the flow of carbon dioxide pellets will enter flow diverter 3 through inlet 22, flow through internal passageway 44 and exit through outlet 30 to the downstream nozzle. In order to redirect the flow to a different downstream nozzle, the flow is interrupted, drive means 72 is actuated and pulley 58 moves second end 42 to a position which is aligned in fluid communication with outlet 32. The flow is then restarted. It is necessary to interrupt the flow of the carbon dioxide pellets during the movement of second end 48 so as to avoid "dead heading" the flow of carbon dioxide pellets, which would result in agglomeration of the pellets and difficulty in clearing internal passageway 44. It is noted that the high pressure transport gas does not have to be interrupted during the realignment process, but only the flow of carbon dioxide pellets.

Because of the cryogenic temperatures present in the flow process, e.g. minus 60° F.–minus 110° F., any moisture present within internal cavity 11 of flow housing 14 or flow diverter assembly 2 can result in the formation of water ice, thereby making rotation of pulley 58 and the concomitant realignment of second end 48 difficult and unreliable. In order to minimize such problems, flow diverter 3 is enclosed by cover 4 and base 6. Internal cavity 11 is slightly pressurized with dry $CO_2$ gas (2-3 psig) (or any other dry inert gas such as argon or helium), which is introduced into internal cavity 11 through fitting 74 and port 76. The $CO_2$ gas fills internal cavity 11 of housing 14, flowing through slots 67 into internal cavity 12, and eventually out through outlet 10. To accommodate any ice which may form or water which may condense in internal cavity 11, drain slots 78 are formed along the bottom of flow diverter housing 14, thereby allowing drainage of melted ice or water into base 6. Base 6 is provided with a drain (not shown) which may be located in flow diverter assembly 2 based on the installation requirements of the particular use of flow diverter assembly 2. It is further noted that flow diverter assembly 2 may be oriented in any direction desired.

Figure 5:
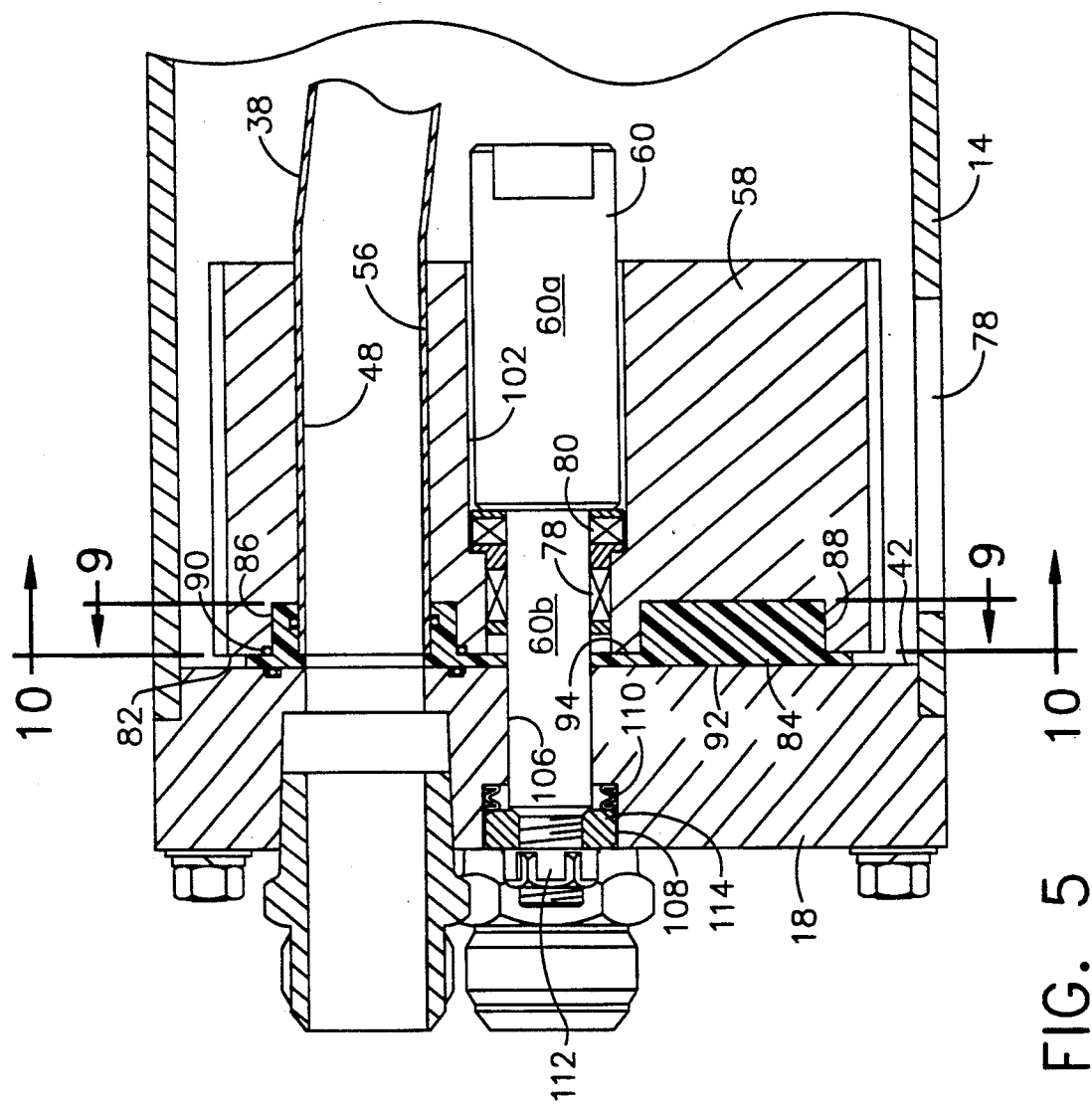
FIG. 5 is a fragmentary, enlarged cross-sectional view of the exit end of the flow diverter.

Flow diverter 3 is provided with a system of seals adjacent first end 46 and second end 48 of flow tube 38, in order to prevent the high pressure transport gas from leaking. Referring now to FIG. 5, there is shown a fragmentary enlarged cross-sectional view of the exit end of flow diverter 3. Pulley 58 is rotatably supported by shaft 60 through needle bearing 78 and thrust bearing 80. Pulley 58 and shaft 60 are made of stainless steel. In the preferred embodiment, needle bearing 78 and thrust Pulley 58 includes bore 56 through which second end 48 of flow tube 38 is disposed. End 48a of second end 48 is disposed substantially flush with surface 82 of pulley 58. Surface 82 is a generally planar surface which is held in a spaced apart relationship from surface 42 of exit end cap 18 by seal plate 84.

Figure 10:
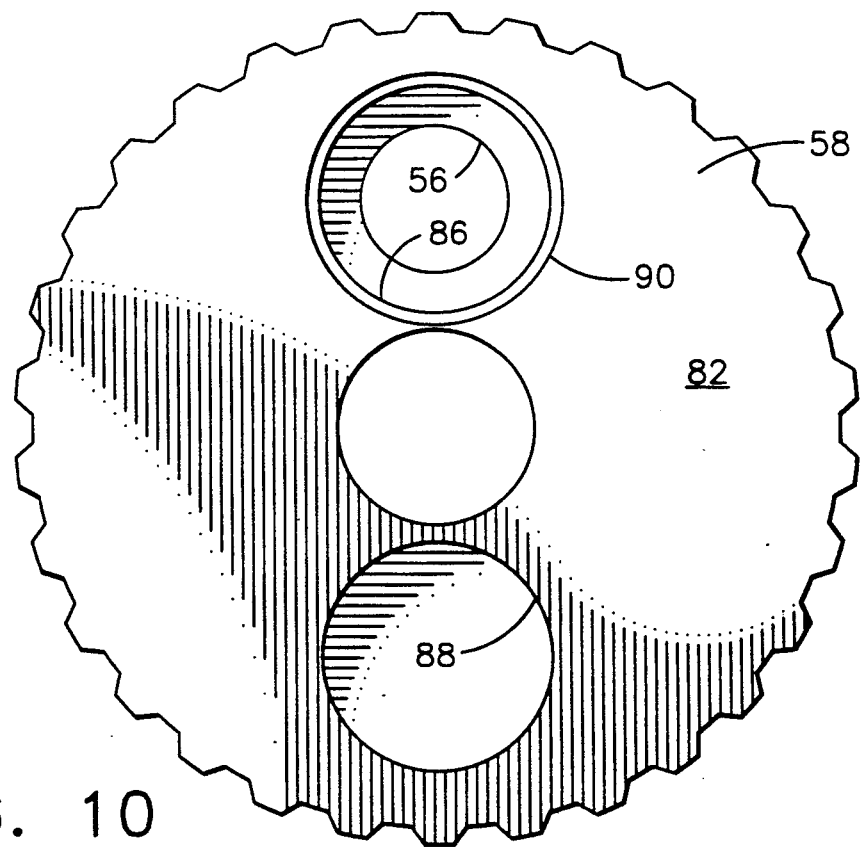
FIG. 10 is an end view of the pulley taken in the direction of line 10—10 of FIG. 5.

Referring also to FIG. 10, pulley 58 includes two recesses 86 and 88 formed in surface 82. Recesses 86 and 88 have approximately the same diameters and depths, and are located approximately equidistant from the center of pulley 58, spaced 180° apart. Recess 86 is aligned with bore 56, being generally concentric therewith. 0-ring recess 90 is formed in surface 82 aligned with recess 86, and generally concentric therewith.

Figure 9:
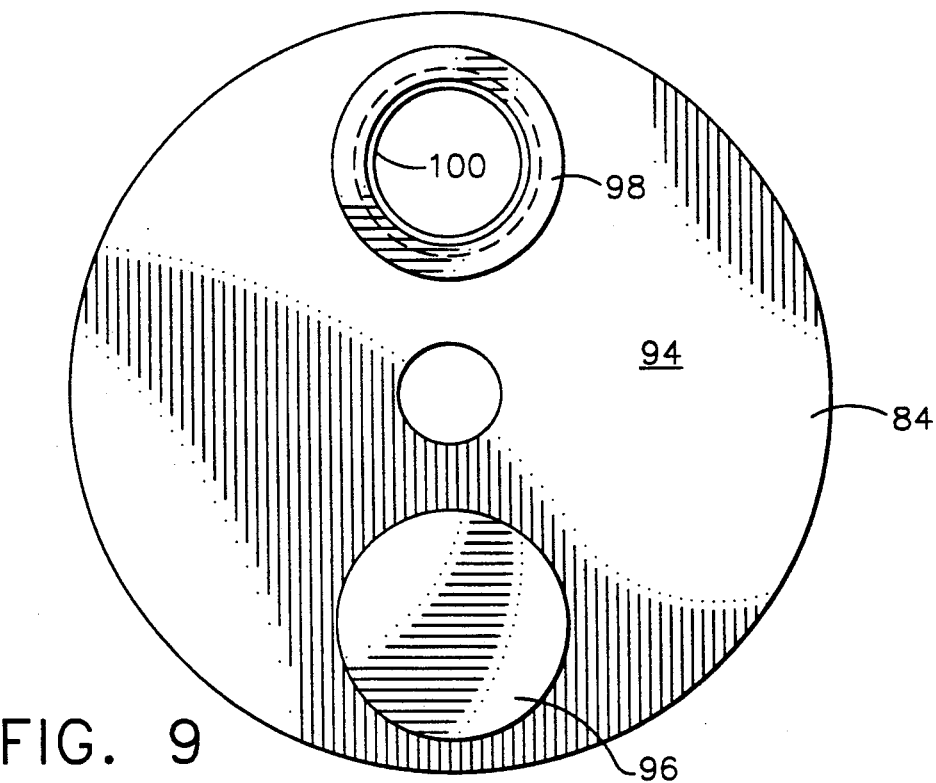
FIG. 9 is an end view of the seal plate taken in the direction of line 9—9 of FIG. 5.

Referring to FIG. 5 and FIG. 9, seal plate 84 includes first and second generally planar surfaces 92 and 94. Boss 96 extends from surface 94, and is shaped complementary to and designed to be received by recess 88. Annular boss 98 also extends from surface 94, at a location 180° from boss 96. The outside diameter and depth of annular boss 98 is shaped complementary to recess 86. Annular boss 98 includes bore 100 which has two diameters and is configured to mate with end 48a of second end 48, as will be described below.

As shown in FIG. 5, seal plate 84 is disposed between surface 42 of exit end cap 18 and surface 82 of pulley 58, maintaining pulley 58 in a spaced apart relationship relative to exit end cap 18. Pulley 58 is urged against seal plate 84, which is in turn urged against surface 42 of exit end cap 18, by the axial preload exerted on pulley 58 by shaft 60.

Shaft 60 includes two portions 60a and 60b, with portion 60b having a smaller diameter than portion 60a, thereby creating step 60c adjacent which thrust bearing 80 is disposed. Pulley 58 includes bore 102 which includes step 104 adjacent which thrust bearing 80 is also disposed. This configuration of shaft 60 and bore 102 allows the axial preload on shaft 60 to urge pulley 58 toward exit end cap 18.

Shaft 60b extends through bore 106 of exit end cap 18. Bore 106 includes an enlarged counter bore 08, in which a high preload crush spring 110 is disposed. Lock nut 112 threadingly engages the end of shaft 60b, and is tightened against spring 110 through spacer 114 until the axial preload is approximately 1200 pounds. This floating shaft construction provides sufficient axial force so as to effect a positive seal and to allow for material shrinkage at cryogenic temperatures without loss of sealing capacity.

Figure 6:
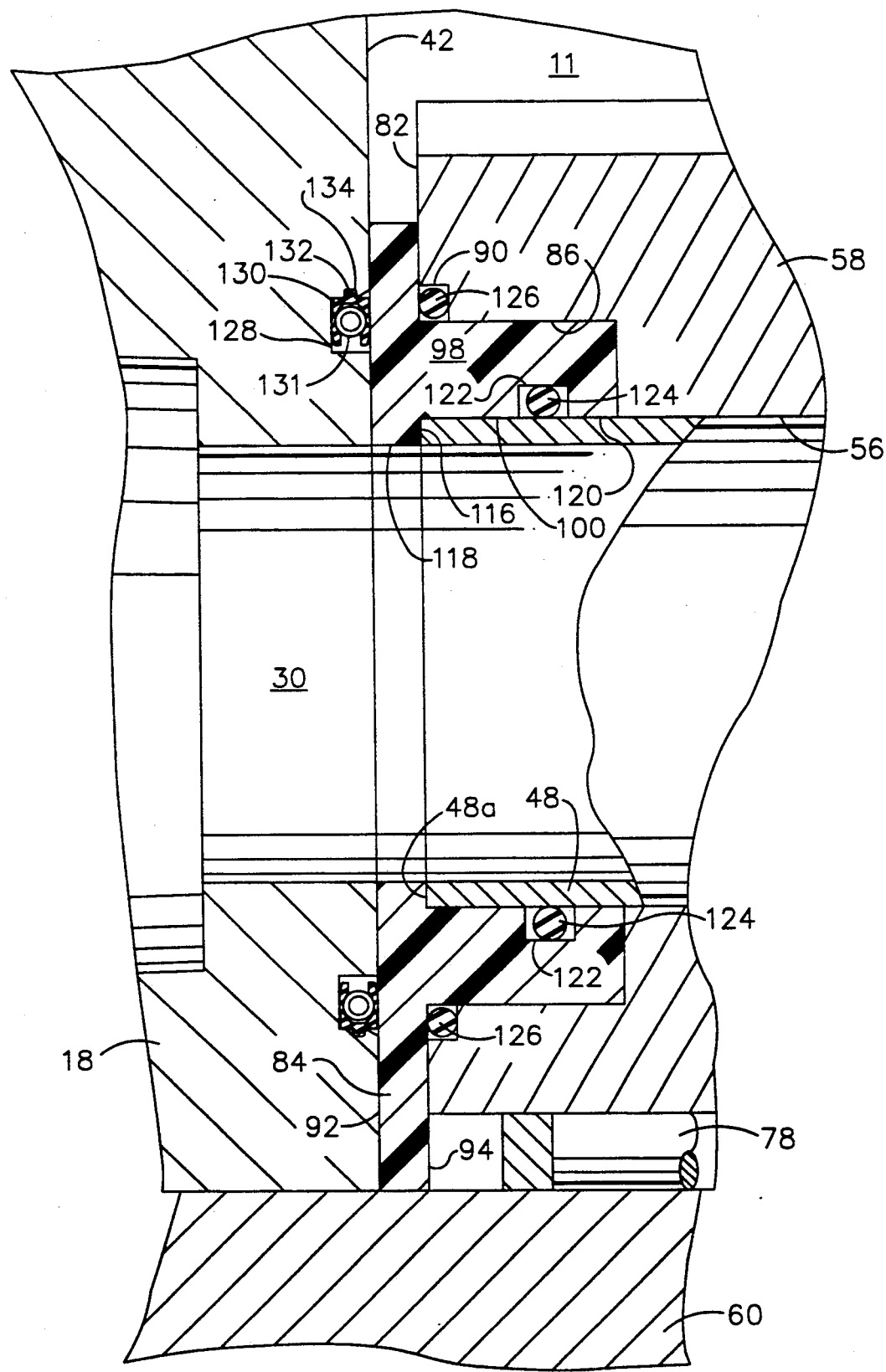
FIG. 6 is a fragmentary, enlarged cross-sectional view of the seals at the exit end of the flow diverter.

Referring to FIG. 6, there is shown an enlarged fragmentary cross-sectional view of annular boss 98 disposed in recess 86. Bore 100 of annular boss 98 includes step 116 against which end 48a of second end 48 is butted. Small diameter portion 118 of bore 100 is approximately equal to the inner diameter of second end 48 as well as the inner diameter of outlet 30. Large diameter portion 120 of bore 100 is approximately equal to the outer diameter of second end 48.

Formed in larger diameter portion 120 of bore 100 is O-ring groove 122. Silicon rubber O-ring 124 is disposed in O-ring groove so as to seal between seal plate 84 and second end 48 of flow tube 38. It is noted that due to the construction of the flow diverter assembly, there is no relative rotation between second end 48 and the components adjacent thereto. O-ring 124 functions to seal against high pressure transport gas which leaks between end 48a and step 116.

Silicone rubber O-ring 126 is disposed in O-ring recess 90 formed in surface 82 of pulley 58. O-ring 126 is disposed in a position so as to seal between pulley 58 and seal plate 84, although it is believed that very little, if any, transport gas leaks past O-ring 124. O-ring 126 also functions to resiliently urge seal plate 84 toward surface 42 relative to pulley 58.

Seal groove 128 is formed in surface 42, about outlet 30, being aligned and generally concentric therewith. Seal 130 is disposed in seal groove 128, so as to provide a seal between surface 42 and surface 92. Seal 130 includes annular rib 132 which engages retaining groove 134 of seal groove 128 so as to hold seal 130 therein. Seal 130 is a face seal made out of Teflon and having a stainless steel garter spring 131 disposed inside of its generally U-shaped cross-section. Garter spring 132 functions to urge both sides of the U-shape seal 130 outwardly relative to each other. Any pressurized transport gas which reaches seal 130 will tend to increase the sealing force exerted by seal 130 by urging both sides of the U shape cross section outwardly. Although in the preferred embodiment, seal 130 is made of Teflon, any material having cryogenic capability with built-in lubricity properties, and which is capable of maintaining the lubricity at low temperatures is acceptable. As mentioned above pulley 58 is axially preloaded at 1200 pounds, thereby urging pulley 58 toward exit end cap 18 with a force of 1200 pounds. In this configuration, seal plate 84, which is made of UHMW polyethylene functions primarily as a bearing plate. The axial force between surface 92 and 130 creates a substantial sealing force between end cap 18 and surface 92 through seal 130. Some sealing occurs between surface 92 and surface 42 because of the axis preload.

In the preferred embodiment of the present invention, there are two outlets, 30 and 32. Although not shown in the figures, it will be understood that outlet 32 includes a respective seal groove similar to seal groove 128 disposed in surface 42 about outlet 32, and that a respective seal similar to seal 130 is disposed in the seal groove about outlet 32. It is noted that each outlet of the flow diverter has a similar seal, functioning to seal between end cap 18 and surface 92 of seal plate 84.

When a particular outlet is aligned with second end 48 of flow tube 38, the sealing arrangement thereabout is identical to that illustrated in FIG. 6. When an outlet, e.g. outlet 32, is not aligned with second end 48, surface 92 of seal plate 84 extends completely across the outlet. Such a configuration seals internal cavity 11 from the ambient environment which is present at outlet 32 when there is no flow through the respective downstream hose and nozzle. This prevents ambient air and moisture from leaking into internal cavity 11. It is noted that the slightly positive pressure of the dry $CO_2$ internal atmosphere tends to prevent any leakage into internal cavity 11 by the ambient atmosphere.

Figure 7:
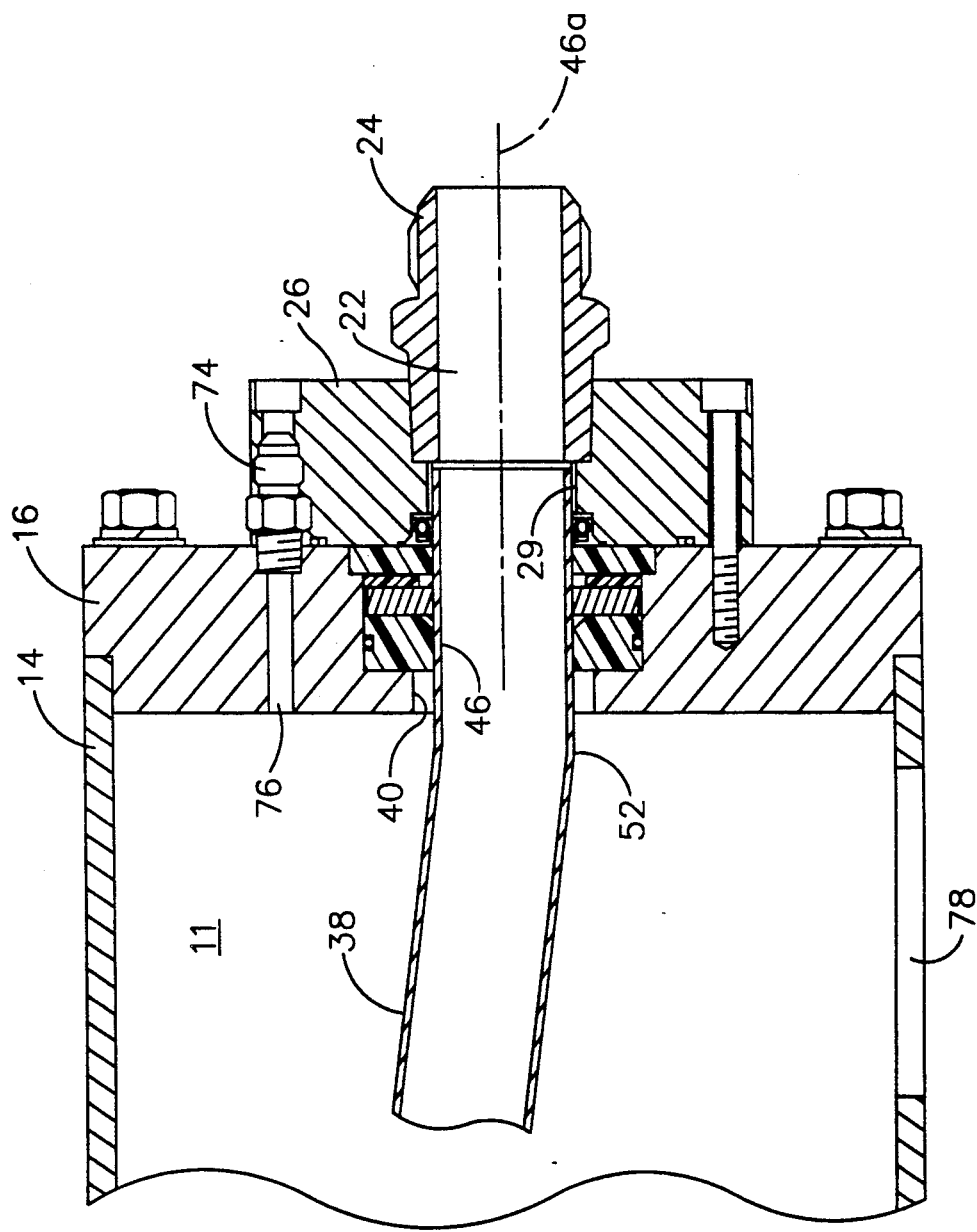
FIG. 7 is a fragmentary, enlarged cross-sectional view of the entrance end of the flow diverter.
Figure 8:
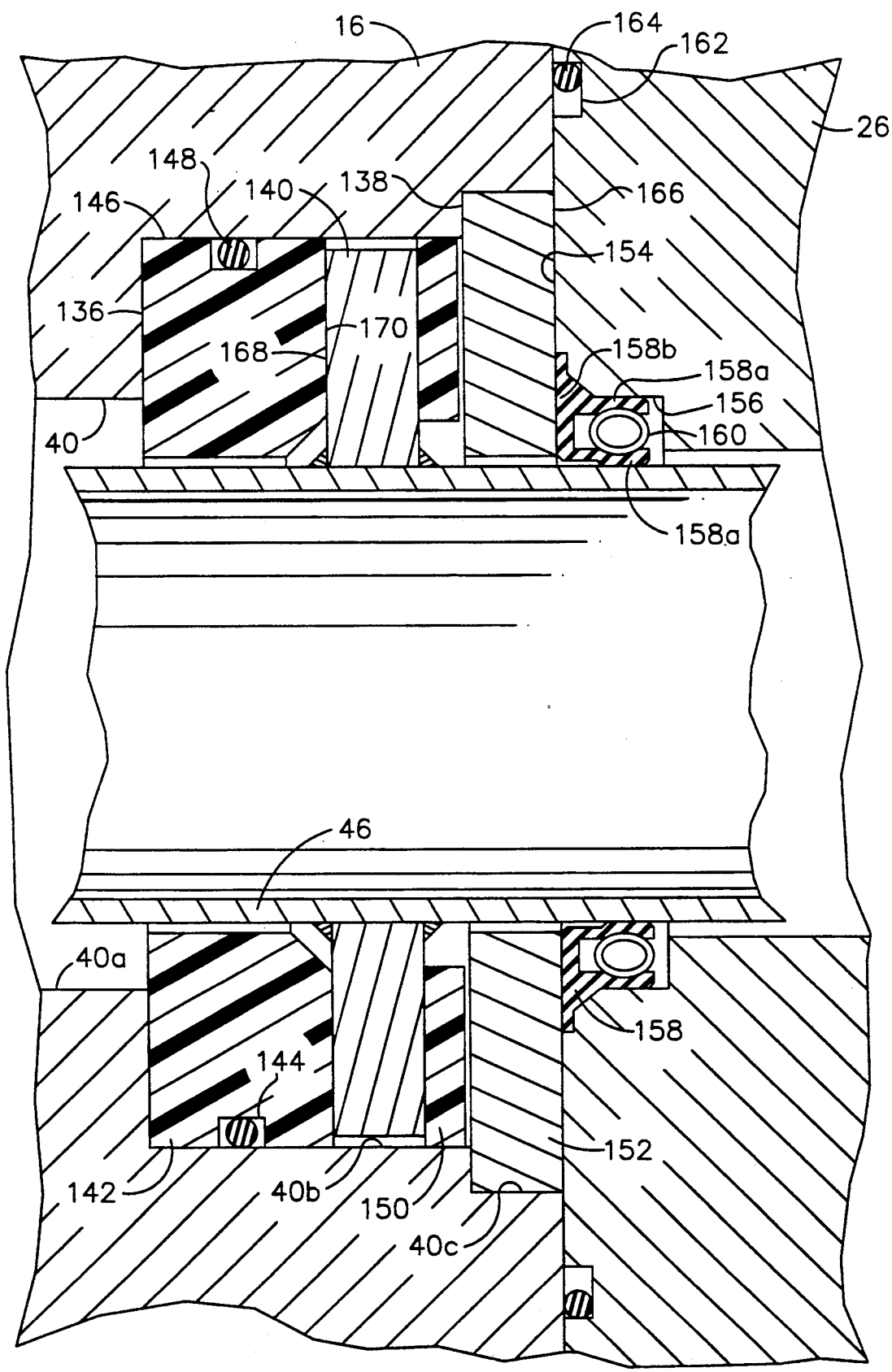
FIG. 8 is a fragmentary, enlarged cross-sectional view of the seals at the entrance end of the flow diverter.

Referring to FIG. 7, there is shown an enlarged, fragmentary view of the entrance end of flow diverter assembly 2. FIG. 8 shows a further enlargement of the entrance end of flow diverter 3, illustrating with more clarity the seal system at the entrance end. Referring generally to both FIGS. 7 and 8, first end 46 of flow tube 38 is rotatably supported by entrance end cap 16 so as to allow first portion 46 to rotate about its axis 46a when second end 48 is moved into alignment with an outlet formed in exit end cap 18. Bore 40 of entrance end cap 16 has three diameters, separated respectively by step 136 and 138. Steps 136 and 138 are configured to retain the various components of the sealing system.

Stainless steel flange 140 is welded to first end 46 of flow tube 38, and rotates therewith. Flange 140 is disposed in portion 40b of bore 40, having an outside diameter slightly less than the inner diameter of portion 40b. Spacer 142, which is made of UHMW polyethylene, is disposed within portion 40b of bore 40, between step 136 and flange 140. The inside diameter of spacer 142 is slightly larger than the outside diameter of first end 46. The outside diameter of spacer 142 is sized complementary to the diameter of portion 40b of bore 40 so as to allow spacer 142 to fit therein. Groove 144 is formed in outside surface 146 of spacer 142. Silicone rubber O-ring 148 is disposed in groove 144, sealing between spacer 142 and bore 40.

Spacer 150, made of UHMW polyethylene is disposed in portion 40b of bore 40 on the opposite side of flange 140 from spacer 142. The sum of the thicknesses of spacer 142, flange 140 and spacer 150 is slightly less than the length of portion 40b of bore 40, which provides some end play and axial movement of flow tube 48. Spacer 142 and spacer 150 are intended not to rotate with respect to bore 40.

Stainless steel spacer 152 is disposed in portion 40c of bore 40, being retained by step 138 and by surface 154 of seal housing 26. The inside diameter of spacer 152 is slightly larger than the outside diameter of first end 46. Spacer 152 does not rotate with respect to bore 40c.

Seal groove 156 is formed in surface 154, generally concentric with bore 29. Seal groove 156 is shaped complementary to seal 158 which is disposed in groove 156. Seal 158 is a combination face and shaft seal, made of graphite-filled Teflon. Shaft seal portion 158a of seal 158 has a generally U-shaped cross section with stainless garter spring 160 disposed therein. Shaft seal portion 158a seals between the outside diameter of first end 46 of flow tube 38 and seal housing 26. The U-shaped cross section of shaft seal portion 58a opens to the high pressure side of the seal, such that the pressure tends to increase the sealing force between seal 158, flow tube 38 and seal housing 26.

Face seal portion 158b of seal 158 seals between spacer 152 and seal housing 26. This is a static face seal since none of the adjacent components rotate relative to each other. The pressure to which the U-shaped shaft seal portion 158a of seal 158 is exposed also functions to urge face seal portion 158b into sealing engagement with spacer 152.

O-ring groove 162 is formed in surface 154 of seal housing 26, generally concentric with bore 29, and has a diameter which is greater than the diameter of portion 40c of bore 40. Silicone rubber O-ring 164 is disposed in groove 162, so as to seal between surface 166 of entrance end cap 16 and seal housing 26.

When flow diverter 3 is in operation, and high pressure transport gas is present in internal passageway 44, flow tube 38 is urged by the pressure toward the exit end of flow diverter 3. As a result, surface 168 of flange 140 is urged against surface 170 of spacer 142, creating a seal therebetween. Any pressurized transport gas which leaks past shaft seal portion 158a will be at least partially contained by the seal thusly created between surfaces 168 and 170, as well as the seal created by O-ring 148 between spacer 142 and portion 40b of bore 40. If pressurized transport gas leaks past face seal portion 158b, it will be contained by the seal created by O-ring 164 between seal housing 26 and surface 166 of entrance end cap 16.

In summary, numerous benefits have been described which result from employing the concepts of the invention. The flow diverter provides a highly reliable system of seals which minimizes leakage of high pressure transport gas, and allows for dimensional changes of the components due to the cryogenic temperatures without loss of sealing capacity. The flow diverter provides a passageway having negligible pressure drop and negligible disturbance to the flow of pellets therein. The flow diverter of the present invention allows multiple nozzles to be connected to a single source of sublimable pellets with high reliability.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A flow diverter comprising:
   (a) an inlet;
   (b) an exit end cap having a generally planar first surface;
   (c) a plurality of outlets, said outlets being formed in said exit end cap;
   (d) a tube defining an internal passageway, said tube having a first end in fluid communication with said inlet, and having a second end which is alternatively alignable in fluid communication with each of said plurality of outlets, said second end being spaced apart from said exit end cap first surface;
   (e) a seal plate having a generally planar first surface, said seal plate first surface being disposed adjacent said exit end cap first surface, said seal plate including a bore formed therethrough, said second tube end being disposed at least partially in said bore;
   (f) first means for sealing between said exit end cap and said seal plate;
   (g) second means for sealing between said second tube end and said seal plate; and
   (h) means for urging said seal plate against said exit end cap first surface.

2. The device of claim 1 wherein said first sealing means comprises at least one annular seal interposed between said exit end cap first surface and said seal plate first surface, said annular seal having a generally U-shaped cross sectional shape which opens inwardly, said at least one annular seal being located to seal against leakage from said internal passageway and from a respective outlet with which said second end of said internal passageway is aligned.

3. The device of claim 2 comprising a plurality of annular grooves formed in said exit end cap first surface, said respective one of said annular grooves being disposed about a respective outlet and having a respective one of said annular seals disposed therein.

4. The device of claim 1 wherein said second means comprises an annular seal interposed between said tube and said seal plate.

5. The device of claim 4 wherein said annular seal is an O-ring.

6. The device of claim 4 wherein said annular seal is interposed between said tube and said bore of said seal plate.

7. The device of claim 6 comprising an annular groove formed in said bore of said seal plate, said annular seal being disposed in said annular groove.

8. The device of claim 1 comprising:
   (a) an entrance end cap having a bore formed therethrough, said entrance end cap having a first generally planar surface;
   (b) a housing having a bore formed therethrough, said bore defining said inlet, said housing having a first generally planer surface, said first housing surface being disposed adjacent said entrance end cap first surface, said housing bore being generally aligned with said entrance end cap bore;
   (c) said first tube end extending through said entrance end cap bore, said first tube end being at least partially disposed in said housing bore; and
   (d) third means for sealing between said housing and said first tube end.

9. The device of claim 8 comprising fourth means for sealing between said housing and said entrance end cap.

10. The device of claim 9 wherein said fourth means comprises an annular seal interposed between said housing and said entrance end cap.

11. The device of claim 8 comprising:
    (a) an annular spacer disposed in said entrance end cap bore, said spacer having a first generally planer surface, said first spacer surface being located adjacent said housing first surface; and
    (b) fifth means for sealing between said housing and said spacer.

12. The device of claim 11 wherein said third and fifth sealing means comprises a combination seal having a face seal portion sealingly engaging said spacer and a shaft seal portion sealingly engaging said first tube end.

13. The device of claim 12 wherein said shaft seal portion comprises and annular seal having a generally U-shaped cross section which opens axially toward said inlet.

14. The device of claim 8 comprising:
    (a) a flange extending radially outward form said first tube end, said flange being disposed in said entrance end cap bore, said flange having a first surface;
    (b) a spacer disposed in said entrance end cap bore, said spacer having a first bearing surface disposed adjacent said first flange surface; and
    (c) means for restricting axial movement of said spacer beyond a predetermined location in said entrance end cap bore.

15. The device of claim 14 comprising fourth means for sealing between said spacer and said entrance end cap bore.

16. The device of claim 15 wherein said fourth sealing means comprises an annular seal interposed between said spacer and said entrance end cap bore.

* * * * *